United States Patent
Tomono et al.

(10) Patent No.: US 11,934,767 B2
(45) Date of Patent: Mar. 19, 2024

(54) INFORMATION PROCESSING APPARATUS, METHOD, AND MEDIUM

(71) Applicant: PFU LIMITED, Kahoku (JP)

(72) Inventors: Eisuke Tomono, Kahoku (JP); Hiroaki Kawanobe, Kahoku (JP); Tomohisa Maeda, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/963,642

(22) Filed: Oct. 11, 2022

(65) Prior Publication Data

US 2023/0034250 A1 Feb. 2, 2023

Related U.S. Application Data (63) Continuation of application No. PCT/JP2020/018063, filed on Apr. 28, 2020.

(51) Int. Cl.
   *G06F 40/166* (2020.01)
(52) U.S. Cl.
   CPC .................. *G06F 40/166* (2020.01)
(58) Field of Classification Search
   CPC .................................. G06F 40/166
   See application file for complete search history.

(56) References Cited

U.S. PATENT DOCUMENTS

| | | | | |
|---|---|---|---|---|
| 5,109,434 A | * | 4/1992 | Shimizu et al. | G06K 9/36 |
| 5,436,734 A | * | 7/1995 | Yamauchi et al. | H04N 1/393 |
| 2006/0235896 A1 | * | 10/2006 | Matoba | G06F 17/30 |
| 2007/0122064 A1 | * | 5/2007 | Arima | G06K 9/03 |
| 2010/0040286 A1 | * | 2/2010 | Matsuzawa | G06K 9/34 |
| 2011/0289504 A1 | * | 11/2011 | Murasawa | G06F 9/46 |
| 2017/0318164 A1 | * | 11/2017 | Ohmi et al. | H04N 1/00074 |

FOREIGN PATENT DOCUMENTS

| | | |
|---|---|---|
| JP | 2006-293903 A | 10/2006 |
| JP | 2011-66551 A | 3/2011 |
| JP | 2014-85716 A | 5/2014 |
| JP | 2014085716 A | 5/2014 |
| JP | 2017-200127 A | 11/2017 |

OTHER PUBLICATIONS

International Search Report dated Jul. 21, 2020, issued in counterpart International Application No. PCT/JP2020/018063. (2 pages).
Office Action dated Jul. 25, 2023, issued in counterpart JP application No. 2022-518471 with English translation. (10 pages).

\* cited by examiner

*Primary Examiner* — James J Debrow
(74) *Attorney, Agent, or Firm* — WHDA, LLP (57) ABSTRACT

An information processing apparatus includes a processor to image an object in accordance with an imaging setting made in advance to acquire a captured image, execute editing of the captured image according to a user instruction, and specify an imaging setting item that allows a captured image to be obtained for which at least a part of the executed editing is unnecessary.

10 Claims, 6 Drawing Sheets

INFORMATION PROCESSING APPARATUS, METHOD, AND MEDIUM

CROSS-REFERENCE TO RELATED APPLICATION

This application is a continuation application of International Application No. PCT/JP2020/018063, filed on Apr. 28, 2020, and designated the U.S., the entire contents of which are incorporated herein by reference.

FIELD

The present disclosure relates to a technology for processing a captured image.

BACKGROUND

There has conventionally been proposed an information processing apparatus that generates a job log as a history of operations and settings on the basis of a user operation, presents, to a user, a sequence of repetitively executed operations among sequences extracted from the job log, registers the operation sequence, and selects the registered sequence to allow the sequential operations and/or settings to be automatically executed thereafter (see Japanese Patent Application Publication No. 2006-293903).

There have also been proposed a device management apparatus (see Japanese Patent Application Publication No. 2011-066551) that acquires, from one or a plurality of management target devices which are connected by a predetermined data transmission path, various logs in which job histories and operation histories are recorded, generates proposal information on the basis of the acquired logs, and presents the generated proposal information to propose an improvement plan and an image processing apparatus (see Japanese Patent Application Publication No. 2017-200127) that acquires scan information of a read image read by an image reading device, generates time variation data on the basis of time variation statistic information of the read image and the scan information, and causes annunciation information to be output when the time variation data does not satisfy a threshold.

SUMMARY

An aspect of the present disclosure is an information processing apparatus including a processor to image an object in accordance with an imaging setting made in advance to acquire a captured image, execute editing of the captured image according to a user instruction, and specify an imaging setting item that allows a captured image to be obtained for which at least a part of the executed editing is unnecessary.

The present disclosure can be recognized as an information processing apparatus, system, method executed by a computer, or a program causing a computer to execute the method.

The present disclosure can also be recognized as a recording medium from which a computer, another device, machine, or the like can read such a program. The recording medium, which can be read by a computer or the like, refers to a recording medium which stores information such as data and a program by an electrical, magnetic, optical, mechanical, or chemical function and allows the information to be read by the computer or the like.

DESCRIPTION OF EMBODIMENTS

Referring to the drawings, embodiments of an information processing apparatus, a method, and a program each according to the present disclosure will be described.

The following embodiments, however, are examples and are not intended to limit the information processing apparatus, method, and program each according to the present disclosure to concrete configurations described below.

In implementing the present disclosure, an appropriate concrete configuration may be used in accordance with a mode of implementation, and various improvements and modifications may also be made therein.

In the present embodiment, a case when the information processing apparatus, method, and program each according to the present disclosure are implemented in a quality check operation assistance system for electronic forms will be described. However, the information processing apparatus, method, and program each according to the present disclosure can be widely used for technologies for processing captured images, and the objects to which the present disclosure can be applied are not limited to the examples shown in the embodiment.

Conventionally, an administrator or operator of a system for scanning (imaging) a document to produce captured images, who does not know the presence of functions that allow an expected captured image to be acquired, may continue to use the system with the functions being disabled, and perform an editing operation on each of the captured images after imaging. The editing operations mentioned herein include, in addition to rotation, deletion, and re-imaging of a captured image or the like, re-recognition and manual inputting of index information (such as, e.g., a barcode value and a character string in a specified region) and the like. Conventionally, when an object such as a document is imaged and stored, it is checked for each of captured images resulting from the imaging whether or not the object has correctly been image-captured, and an editing operation such as rotation, deletion, or re-imaging of the captured image is performed as necessary. In addition, it is checked whether or not index information (e.g., a barcode value or a character string in a specified region) required to manage the captured images has correctly been extracted, and an editing operation such as re-recognition or manual inputting is performed as necessary. Meanwhile, a system that produces captured images has a large number of functions for acquiring a captured image expected by the user, but there are cases where an administrator or an operator who makes imaging settings continues to use the system without knowing the functions, and performs the editing operation on each of the captured images after imaging, as described above. It is to be noted herein that, as described above, various technologies of registering the repetitively executed operations and allowing the operations to be automatically executed have conventionally been proposed. However, each of these technologies allows the repetitively executed operation itself to be automated, and cannot prevent occurrence of an editing operation that would have been unnecessary in the first place if imaging settings had been made correctly, even though it is possible to automate, e.g., a post-imaging editing operation.

A conceivable cause of, i.e., a reason for such a situation, is that, while the administrator is required to be trained in order to understand the numerous functions of the system for producing captured images and operate the system by making appropriate settings, inmost cases, time and cost for the training cannot sufficiently be prepared. Meanwhile, it can also be considered to enable these functions by default. However, when the functions are enabled by default, problems (1) and (2) below arise: (1) when the default settings are changed during updating of the system, tasks already in operation are significantly affected and (2) since the enabling these functions by default is not necessarily effective (e.g., a tradeoff with degradation of performance during scanning), it is required to consider working efficiency of an entire digitizing operation and make detailed adjustment for each operation.

Accordingly, in the system described in the present embodiment, by eliminating the need to train the administrator or operator to understand the numerous functions of the system and allowing the administrator or operator to easily make settings for optimally using the system according to task types, it is possible to reduce useless operations by the operator and improve task efficiency.

System Configuration

Figure 1:
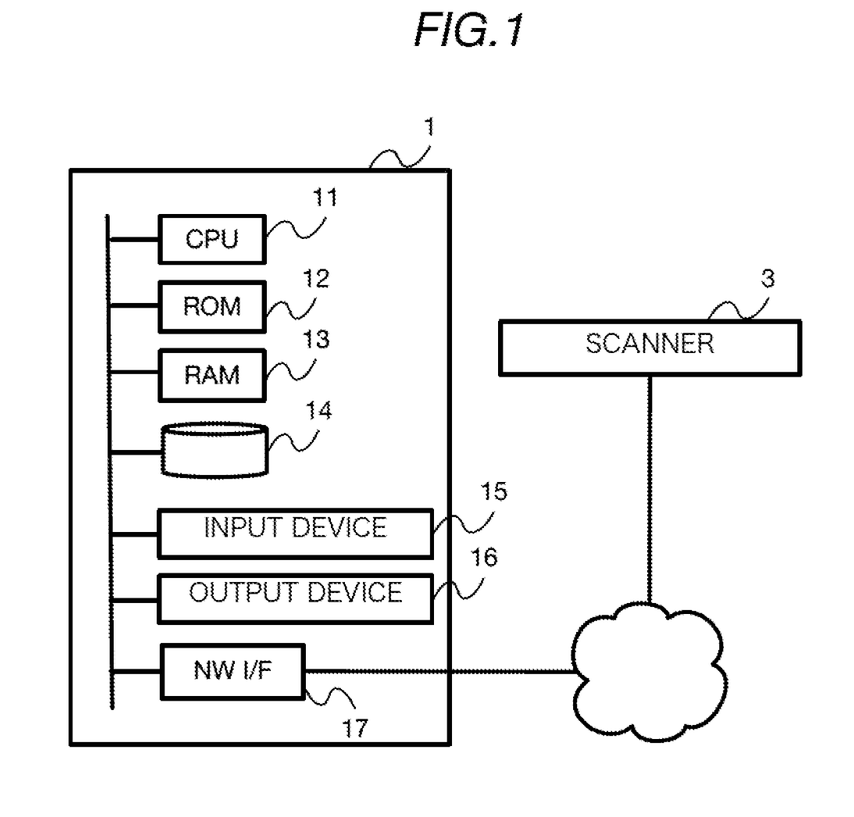
FIG. 1 is a schematic diagram illustrating a configuration of a system according to an embodiment.

FIG. 1 is a schematic diagram illustrating a configuration of the system according to the present embodiment. The system according to the present embodiment includes a scanner 3 and an information processing apparatus 1 which are communicatively connected to each other via a network or another communication unit.

The information processing apparatus 1 is a computer including a central processing unit (CPU) 11, a read only memory (ROM) 12, a random access memory (RAM) 13, a storage device 14 such as an electrically erasable and programmable read only memory (EEPROM) and a hard disk drive (HDD), an input device 15 such as a keyboard, a mouse, and a touch panel, an output device 16 such as a display, a communication unit 17, and the like. For the specific hardware configuration of the information processing apparatus 1, composing elements may be omitted, replaced, or added appropriately depending on a mode of implementation. In addition, the information processing apparatus 1 is not limited to an apparatus made of a single housing. The information processing apparatus 1 may also be implemented by a plurality of apparatuses using a so-called cloud or distributed computing technology or the like.

The scanner 3 is a device that images a manuscript such as a document, a name card, a receipt or a photograph/illustration to acquire image data. Note that, in the present embodiment, as the device for acquiring images of the object, the scanner 3 is shown by way of example, but the device used to acquire images is not limited to a so-called scanner. For example, it may also be possible to use, e.g., a digital camera or a camera sensor embedded in a smart phone/tablet to image the object and obtain images.

The scanner 3 according to the present embodiment has the function of transmitting, to the information processing apparatus 1, the image data resulting from the imaging via a network. The scanner 3 may also further have a user interface for allowing character inputting/outputting or item selection, such as a touch panel display or a keyboard, a Web browse function, and a server function. A communication unit, a hardware configuration, and the like of the scanner to which a method according to the present embodiment is applicable are not limited to those shown by way of example in the present embodiment.

Figure 2:
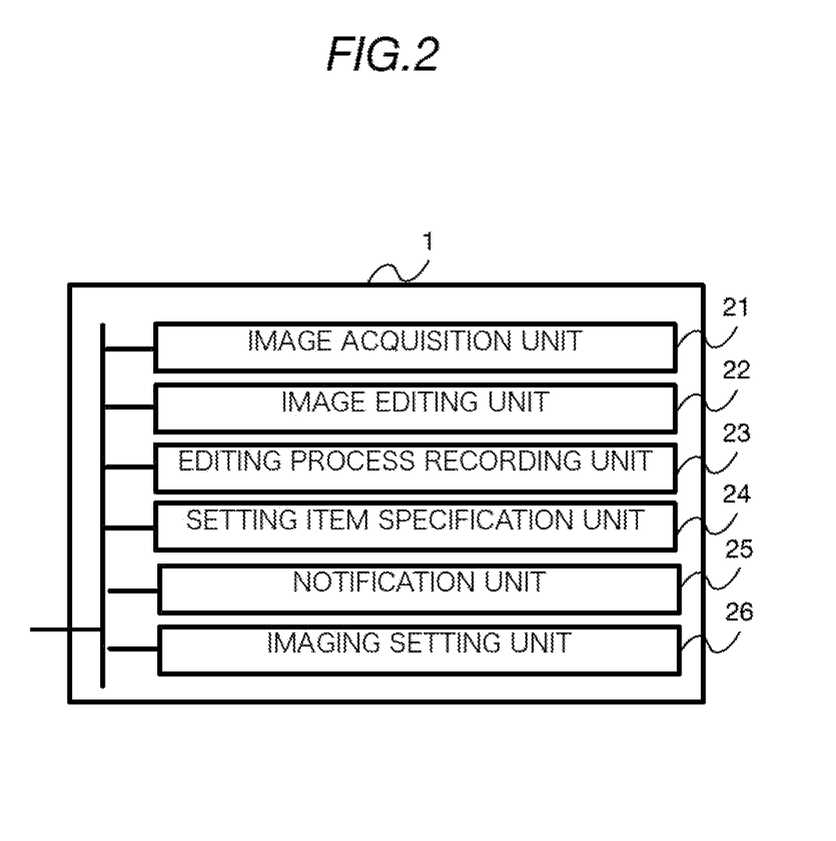
FIG. 2 is a diagram illustrating an outline of a functional configuration of an information processing apparatus according to the embodiment.

FIG. 2 is a diagram illustrating an outline of a functional configuration of the information processing apparatus 1 according to the present embodiment. The information processing apparatus 1 functions as an information processing apparatus including an image acquisition unit 21, an image editing unit 22, an editing process recording unit 23, a setting item specification unit 24, a notification unit 25, and an imaging setting unit 26 through reading of a program recorded in a storage device 14 into the RAM 13, execution of the program by the CPU 11, and control of each of hardware items included in the information processing apparatus 1. Note that, in the present embodiment and other embodiments described later, each of functions of the information processing apparatus 1 is executed by the CPU 11 which is a versatile processor, but one or all of these functions may also be performed by one or a plurality of dedicated processors.

The image acquisition unit 21 images one or a plurality of objects according to imaging settings made in advance to acquire one or a plurality of captured images. In the present embodiment, as the imaging settings, the settings made in advance for individual types of the objects (hereinafter referred to as "document profiles") are used. More specifically, in the present embodiment, the imaging settings are settings made with respect to a scanner driver and a capture application which operate in the information processing apparatus 1 and, on the basis of the imaging settings, the scanner driver and the capture application operate, and processing of acquiring pre-editing captured images as output images at a stage before checking and editing by the user is allowed is performed. Note that, in the present embodiment, a description will be given of an example in which an object to be imaged is a document, and imaging is performed using the scanner. However, the object to be imaged and an imaging method are not limited to those shown by way of example in the present embodiment. For example, a scene or a person may also be imaged using a camera.

The image editing unit 22 performs, according to a user instruction, editing of one or a plurality of captured images.

The editing process recording unit 23 records, for each of the types of the objects, one or more editing processes (if any) executed by the image editing unit 22 on the captured images and the number of executions for each editing process. The one or more editing processes mentioned herein includes at least any of deletion of a blank page, correction of an image orientation, division of a document including a plurality of pages, image cutout, removal of a punched hole part of an image, and correction of an OCR result.

The setting item specification unit 24 specifies an imaging setting item (imaging setting item which eliminates the need for editing or saves labor) that allows a captured image to be obtained for which at least a part of the editing executed by the image editing unit 22 is unnecessary. The imaging setting item mentioned herein includes at least any of automatic detection of a blank page, automatic deletion of the blank page, automatic determination of an image orientation, automatic correction of the image orientation, automatic division of a document, automatic image cutout, automatic removal of a punched hole part of an image, and changing of OCR settings.

The following will show an example of the imaging setting item (hereinafter referred to as "recommended settings") specified by the setting item specification unit 24 in the present embodiment.

(1) When the editing process is "manual deletion of a blank page", as the imaging setting item, "automatic detection/deletion of a blank image" is specified. When the blank image is not required, it becomes possible to automatically delete the blank image by editing the document profile and setting blank page detection. Meanwhile, when it is intended to allow a blank image to be easily found, it becomes possible to automatically add a mark to the blank image by editing the document profile and make mark settings.

(2) When the editing process is "manual correction of an image orientation", as the imaging setting item, "automatic determination & rotation of an image orientation" is specified. When the image orientation is not correct, it becomes possible to automatically rotate the image into a correct orientation by editing the document profile and setting automatic rotation.

(3) When the editing process is "manual division of a document (a bundle of images)", as the imaging setting item, "automatic division of a document" is specified. When it is intended to automatically divide the document, it is recommended to edit the document profile and set a document separator.

Note that recommended settings of which the user is to be notified are not limited to the above settings, and it is possible to target all the imaging settings to which improvements can be proposed on the basis of a history of editing operations. For example, (4) when a manuscript portion is manually cut out from an image, cropping settings may also be recommended, (5) when a punched hole portion of a manuscript is manually deleted from an image, punched hole removal settings may also be recommended, and (6) when correction of the OCR result is frequently performed, re-examination of the OCR settings may also be recommended.

Note that, in in-operation scan processing in the system according to the present embodiment, when the number of executions for any editing process, which has been recorded by the editing process recording unit 23, satisfies a predetermined reference, the setting item specification unit 24 specifies the imaging setting item that allows a captured image to be obtained, not requiring at least a part of the editing related to the editing process that satisfies the predetermined reference. The number of executions used herein is not limited to a cumulative number before a determination time point. As the number of executions, a reference differing depending on the embodiment, such as a number (e.g., n times/100 images) per unit number of images calculated from the number of real operations or a number (e.g., n times/month) per unit time, may also be used.

In the present embodiment, as a predetermined reference (threshold) to be compared to the number of executions of an editing operation, a fixed threshold may also be used. As the threshold, a value differing from one recommended imaging setting item to another can be adopted. For example, for the imaging setting item "automatic detection/deletion of a blank image", a required condition may be set such that the number of times blank pages were manually deleted is not less than N1, for the imaging setting item "automatic determination & rotation of an image orientation", a required condition may be set such that the number of times the image orientation was manually corrected is not less than N2, and for the imaging setting item "automatic division of a document", a required condition may be set such that the number of times the document was manually divided is not less than N3. In addition, by adjusting these references (thresholds), it becomes possible to make notifications at a frequency which does not interrupt the operation performed by the user and with timing having an improving effect. Note that the predetermined reference (threshold) to be compared to the number of executions of the editing operation may be set to a fixed value or may also be set to a dynamically variable value.

The notification unit 25 notifies the user of the imaging setting item specified by the setting item specification unit 24.

The imaging setting unit 26 sets the imaging setting item specified by the setting item specification unit 24 when an instruction to accept the imaging setting item of which the user is notified is input by the user.

Flow of Processing

Next, a flow of processing to be executed by the information processing apparatus 1 according to the present embodiment will be described. Note that specific details and execution order of the processing described below are examples for carrying out the present disclosure. The specific processing details and execution order may be selected appropriately depending on the embodiment of the present disclosure.

Figure 3:
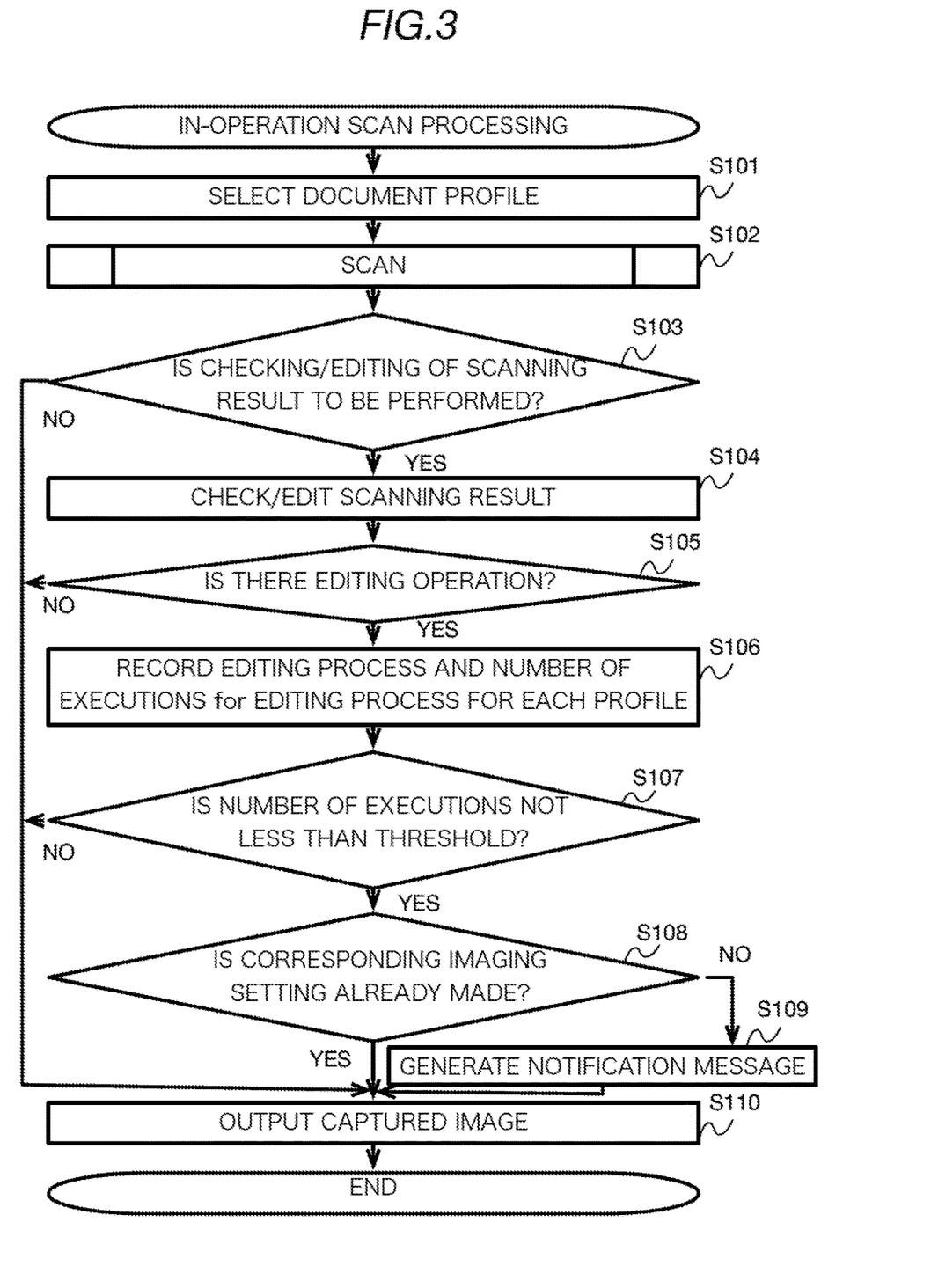
FIG. 3 is a flow chart illustrating an outline of a flow of in-operation scan processing according to the embodiment.

FIG. 3 is a flowchart illustrating an outline of a flow of the in-operation scan processing according to the present embodiment. The processing illustrated in the present flowchart is executed upon starting of an operation of scanning a manuscript by the operator.

In Steps S101 and S102, the document profile is selected, and the manuscript is scanned. In the present embodiment, the document profile is information collectively defining scanning settings, a sorting method, metadata, and an output method and, for each of task types, a different profile can be defined. The operator selects, from a document profile list screen, the defined document profile according to the task type (Step S101), and performs scanning of the manuscript to be processed with the selected document profile. The image acquisition unit 21 controls the scanner 3 on the basis of the imaging settings corresponding to the document profile specified by the operator to image the manuscript set to the scanner 3, and further performs processing based on the imaging settings on a captured image (driver output image) to acquire a pre-editing captured image of the manuscript (Step S102). Then, the processing advances to S103.

In Step S103, it is determined whether or not checking and editing of a scanning result is to be performed. The information processing apparatus 1 determines, on the basis of the imaging settings corresponding to the document profile or according to an operator instruction input after the imaging, whether or not the checking and editing of the acquired pre-editing captured image is to be performed. When the checking and editing of the scanning result is not performed, the processing advances to Step S110. On the other hand, when the checking and editing of the scanning result is performed, the processing advances to Step S104.

In Steps S104 to S106, an operation of checking/editing the scanning result is performed, and details of the editing operation are recorded for each of the document profiles. The image editing unit 22 provides a user interface for checking/editing the captured image, and performs editing of the captured image according to a user instruction input by the operator who has referenced the user interface (Step S104). When no editing operation is performed (NO in Step S105), the processing advances to Step S110. On the other hand, when an editing operation is performed (YES in Step S105), the editing process recording unit 23 records, for each of the types of the objects (in other words, for each of the document profiles), one or more editing processes (if any) executed by the image editing unit 22 on the captured image and the number for executions of each editing process (Step S106), and the processing advances to S107.

In Steps S107 to S109, when the number of executions of any of the editing operations becomes not less than the threshold and the imaging settings which eliminate the need for the any of the editing operations are not made, a notification message recommending the imaging settings is generated. When the number of executions of the same operation recorded by the editing process recording unit 23 for any editing process exceeds a given frequency (threshold) (YES in Step S107) and the imaging settings which eliminate the need for the operation is not made to the document profile (NO in Step S108), the setting item specification unit 24 specifies the imaging setting item which allows the captured image to be obtained, not requiring at least a part of the editing related to the editing process for which the number of executions of the same operation exceeds the given frequency. Then, the notification unit 25 notifies the user of the imaging setting item specified by the setting item specification unit 24 (Step S109). On the other hand, when the number of executions of the editing operation does not become not less than the threshold (NO in Step S107) or when the settings which eliminate the need for the editing operation is already made (YES in Step S108), no notification message is generated. Then, the processing advances to Step S110.

In Step S110, the edited captured image (when editing is skipped in Step S103, the unedited captured image) is output. Then, the processing illustrated in the present flowchart is ended.

Figure 4:
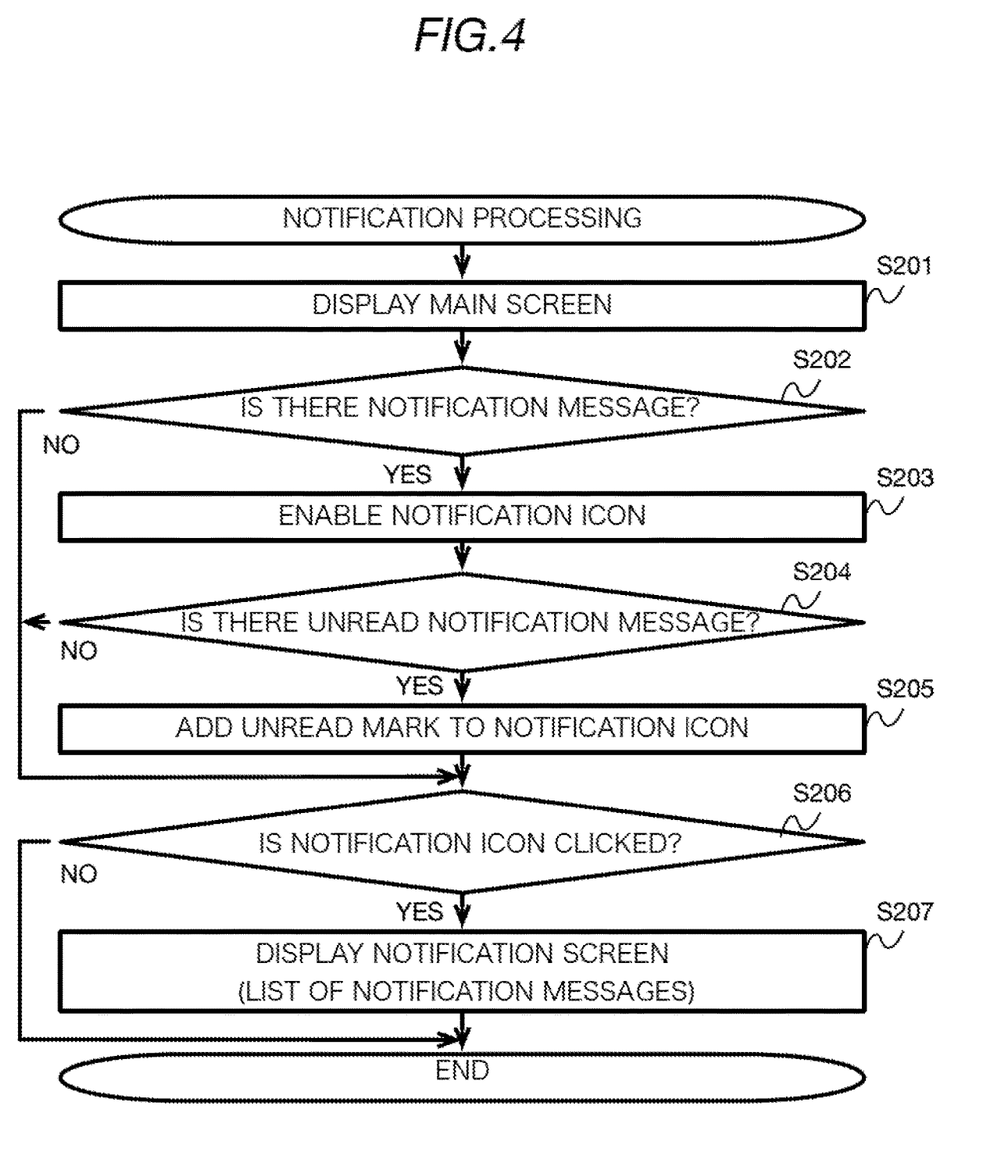
FIG. 4 is a flow chart illustrating an outline of a flow of notification processing according to the embodiment.

FIG. 4 is a flowchart illustrating an outline of a flow of notification processing according to the present embodiment. The processing illustrated in the present flow chart is executed upon reception of an operation of displaying a main screen of the capture application in the information processing apparatus 1.

The information processing apparatus 1 displays the main screen on the display (Step S201). When there is a notification message (a point to be improved in what is currently set) generated in Step S109 of the in-operation scan processing (YES in Step S202), the notification unit 25 enables a notification icon on the main screen (Step S203). Then, when existing notification messages include an unread notification message (YES in Step S204), the notification unit 25 adds an unread mark onto the notification icon (Step S205). On the other hand, where there is no notification message (NO in Step S202), the enabling of the notification icon is skipped and, when there is no unread notification message (NO in Step S204), the addition of the unread mark is skipped. Then, when the notification icon is clicked (YES in Step S206), a notification screen is displayed, and a list of notification messages (specific improvement proposals) related to all the document profiles generated in Step S109 of the in-operation scan processing is displayed (Step S207). Then, the processing illustrated in the present flow chart is ended.

Note that each of the displayed notification messages is brought into a read state, and the unread mark on the notification icon is erased. The issued notification messages (specific improvement proposals) can be erased one by one by clicking an erase button icon or can simultaneously be erased by clicking a "CLEAR ALL NOTIFICATIONS" button icon. When all the notifications are erased, the notification icon is disabled, and the icon can no longer be clicked.

According to the present embodiment, the execution of the notification processing described above allows the administrator to improve the settings of the document profile, while viewing details of the notification. However, whether or not to notify by the notification unit 25 may also be optionally settable for the entire system or for each of the users. In this case, an experienced user who is familiar with the functions can use the system without receiving a bothersome notification while the system is operated by setting no notification.

Note that, in the present embodiment, it is assumed that a notification is issued via the capture application, but the notification may also be issued using another unit such as a mail or a chat tool.

Figure 5:
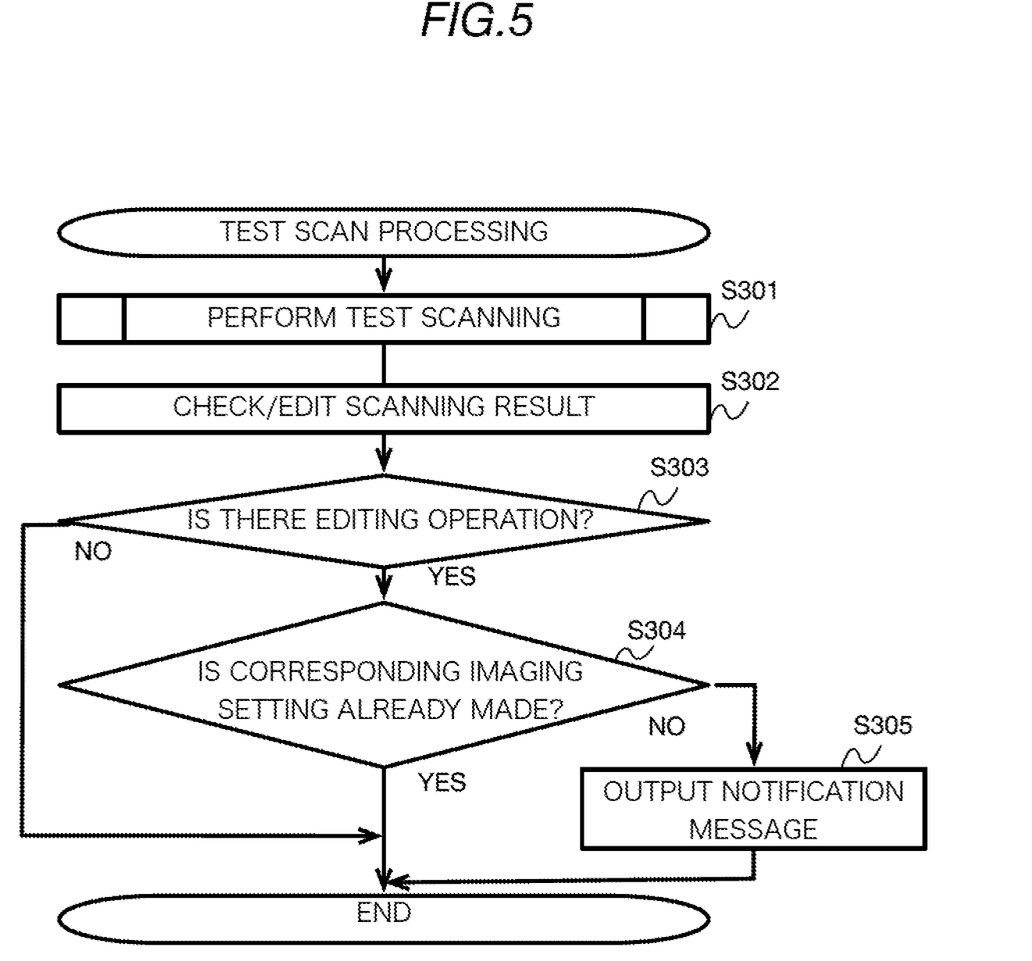
FIG. 5 is a flow chart illustrating an outline of a flow of test scan processing according to the embodiment.

FIG. 5 is a flow chart illustrating an outline of a flow of test scan processing according to the present embodiment. The processing illustrated in the present flow chart is executed upon inputting of an instruction to newly produce a document profile or edit the document profile by the administrator.

In Step S301, test scanning of a manuscript is performed. The administrator produces a new document profile according to a task type or selects the defined document profile, and performs test scanning of the manuscript intended to be processed with the selected document profile. The image acquisition unit 21 controls the scanner 3 on the basis of the imaging settings corresponding to the document profile specified by the administrator to image the manuscript set to the scanner 3, and further performs processing based on the imaging settings on the captured image to acquire a captured image of the manuscript. Then, the processing advances to Step S302.

In Steps S302 to S305, when there is an operation of editing the scanning result and settings which eliminate the need for the editing operation have not been made, a message recommending the settings is issued. The image editing unit 22 provides a user interface for editing the captured image, and performs editing of the captured image according to a user instruction input by the administrator who has referenced the user interface (Step S302). When the editing operation is performed (YES in Step S303) and the imaging settings which eliminate the need for the operation are not made to the document profile (NO in Step S304), the setting item specification unit 24 specifies the imaging setting item which allows the captured image to be obtained, not requiring at least a part of the editing related to the performed editing process. Then, the notification unit 25 notifies the user of the imaging setting item specified by the setting item specification unit 24 (Step S305). On the other hand, where there is no editing operation (NO in Step S303) and the settings which eliminate the need for the editing operation are made (YES in Step S304), the processing in Step S305 is skipped. Then, the test scanning is ended, and the processing illustrated in the present flow chart is ended.

In other words, in the test scan processing illustrated in the present flow chart, when the editing operation corresponding to the recommended imaging settings is performed, a notification of the recommended imaging settings is immediately issued. This allows the administrator to improve the settings of the document profile, while viewing details of the notification.

Variation

A description will be given below of an example in which the predetermined reference (threshold) to be compared to the number of executions of the editing operation is set to a dynamically variable value. In the system according to the present disclosure, when the number of executions of any editing operation becomes not less than the predetermined reference, a notification recommending the corresponding imaging settings is issued. However, when the degree of proficiency of the administrator is low, it can be considered that, even when a notification of the recommended settings is issued, it takes long to change the settings to result in "TIME SPENT TO CHANGE SETTINGS>IMPROVEMENT EFFECT". In view of such a possibility, a configuration in which a notification threshold is variable depending on the degree of proficiency of the administrator may also be used.

Figure 6:
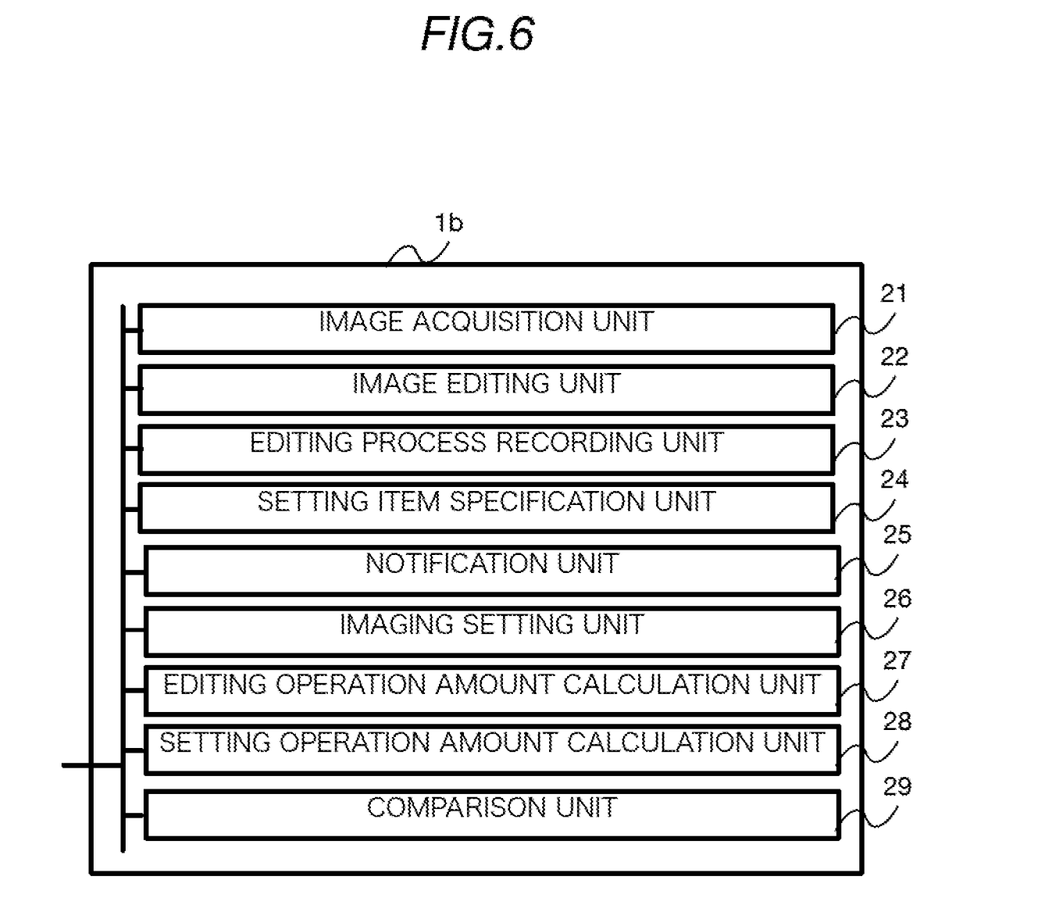
FIG. 6 is a diagram illustrating an outline of a functional configuration of an information processing apparatus according to a variation.

FIG. 6 is a diagram illustrating an outline of a functional configuration of an information processing apparatus 1b according to a variation. A configuration of the system is substantially the same as that in the embodiment described above, and accordingly a description thereof is omitted. The information processing apparatus 1b functions as an information processing apparatus including, in addition to the image acquisition unit 21, the image editing unit 22, the editing process recording unit 23, the setting item specification unit 24, the notification unit 25, and the imaging setting unit 26 in the embodiment described above, an editing operation amount calculation unit 27, a setting operation amount calculation unit 28, and a comparison unit 29 through reading of a program stored in the storage device 14 into the RAM 13, execution of the program by the CPU 11, and control of each of hardware items included in the information processing apparatus 1b.

The editing operation amount calculation unit 27 calculates an editing operation amount required for the image editing unit 22 to perform editing related to an editing process.

The setting operation amount calculation unit 28 calculates a setting operation amount required to set the imaging setting item specified by the setting item specification unit 24.

The comparison unit 29 compares the editing operation amount calculated for the editing process and the setting operation amount calculated for the imaging setting item corresponding to the editing process.

In the present embodiment, when it is determined that the setting operation amount is smaller than the editing operation amount as a result of the comparison by the comparison unit 29, the notification unit 25 notifies the user of the imaging setting item related to the comparison.

Specifically, in order to measure the degree of proficiency of the administrator, the time spent by the administrator in changing the document profile and an amount of the document profile change (e.g., the number of changed items) are recorded. Then, using the following calculation formulae, the degree of proficiency (how much the document profile can be changed in a unit time) of the administrator is calculated. Since the time spent setting the document profile is assumed to vary depending on details of the settings, in the example shown herein, it is assumed that a median of data for previous N times that the document profile has changed is used. However, for the calculation of the degree of proficiency, other calculation formulae may also be used.

DEGREE OF PROFICIENCY=MEDIAN AMOUNT OF DOCUMENT PROFILE CHANGES FOR PREVIOUS N TIMES/MEDIAN DOCUMENT PROFILE EDITING TIME FOT PREVIOUS N TIMES

Then, from the calculated degree of proficiency, the time required to change the document profile (setting operation amount) can be expected. For the calculation of the setting operation amount, for example, the following calculation formula can be used.

SETTING OPERATION AMOUNT=AMOUNT OF DOCUMENT PROFILE CHANGE/DEGREE OF PROFICIENCY

Meanwhile, a total time of individual operations (editing operation amount) by a target operator can be estimated as follows.

EDITING OPERATION AMOUNT=NUMBER OF EXECUTIONS OF THE OPERATION USING THE DOCUMENT PROFILE×DEEMED TIME REQUIRED FOR THE OPERATION

Note that the number of executions used herein is not limited to a cumulative number before a determination time point. As the number of executions, a reference differing depending on the embodiment, such as a number (e.g., n times/100 images) per unit number of images calculated from the number of real operations or a number (e.g., n times/month) per unit time, may also be used.

Then, using the setting operation amount and the editing operation amount each mentioned above, the notification threshold is determined as follows.

THRESHOLD FOR IMAGING SETTING ITEM "AUTOMATIC DETECTION/DELETION OF BLANK IMAGE": EDITING OPERATION AMOUNT FOR MANUALLY DELETING BLANK PAGE>SETTING OPERATION AMOUNT FOR CHANGING SETTINGS OF AUTOMATIC DETECTION/DELETION OF BLANK IMAGE

THRESHOLD FOR IMAGING SETTING ITEM "AUTOMATIC DETERMINATION & ROTATION OF IMAGE ORIENTATION": EDITING OPERATION AMOUNT FOR MANUALLY CORRECTING IMAGE ORIENTATION>SETTING OPERATION AMOUNT FOR CHANGING SETTINGS OF AUTOMATIC DETERMINATION & ROTATION OF IMAGE ORIENTATION

THRESHOLD FOR IMAGING SETTING ITEM "AUTOMATIC DIVISION OF DOCUMENT": EDITING OPERATION AMOUNT FOR MANUALLY DIVIDING DOCUMENT>SETTING OPERATION AMOUNT FOR CHANGING SETTINGS OF AUTOMATIC DIVISION OF DOCUMENT.

Effect

With the system according to the embodiment described above, when there is a function used during editing of a captured image, by proposing a setting item that is for imaging, and that allows an edited captured image by the editing to be obtained, it is possible to reduce, depending on an operation status, useless operations by an operator when a paper document is digitized without particularly training an administrator and an operator and improve a task efficiency (productivity). In addition, with the system according to the embodiment described above, it is possible to specify an appropriate setting item according to details of acquisition of a captured image and an editing operation.

What is claimed is:

1. An information processing apparatus comprising a processor and a memory to:

image, by the processor, a plurality of objects in accordance with an imaging setting to acquire a plurality of images, execute, by the processor, for each of the plurality of images, editing of the image according to an editing instruction given by a user who has performed a quality check of the image after the image has been acquired, the editing instruction given by an operation for manually editing the image, record, by the memory, editing processes related to editings executed on the plurality of images according to editing instructions and, for each editing process, a number of executions of the editing related to the each editing process, and specify, by the processor, when the number of executions of the editing recorded for any of the editing processes satisfies a predetermined reference, an imaging setting item that allows an image to be obtained for which at least a part of the editing related to the any of the editing processes is unnecessary, based on the any of the editing processes.

2. The information processing apparatus according to claim 1, wherein the processor further notifies the user of the specified imaging setting item.

3. The information processing apparatus according to claim 1, wherein the processor acquires, for each of types of the objects, the images in accordance with the imaging setting made for the type of the object in advance, and wherein the memory records, for each of the types of the objects, the editing processes related to editings executed on the images according to the editing instructions and, for each editing process, the number of executions of the editing related to the each editing process.

4. The information processing apparatus according to claim 3, wherein the processor further:
calculates an editing workload required to execute the editing related to the any of the editing processes;
calculates a setting workload required to set the specified imaging setting item; and
compares the editing workload calculated for the editing process and the setting workload calculated for the imaging setting item corresponding to the editing process, and wherein the processor notifies, when the setting workload is determined to be smaller than the editing workload as a result of the comparison, the user of the imaging setting item related to the comparison.

5. The information processing apparatus according to claim 3, wherein the processor further:
calculates an editing operation amount required to execute the editing related to the any of the editing processes;
calculates a setting operation amount required to set the specified imaging setting item; and
compares the editing operation amount calculated for the editing process and the setting operation amount calculated for the imaging setting item corresponding to the editing process, and wherein the processor notifies, when the setting operation amount is determined to be smaller than the editing operation amount as a result of the comparison, the user of the imaging setting item related to the comparison, and
wherein the setting operation amount is an amount of change of the imaging setting made for the type of the object divided by a degree of proficiency of an operator of the information processing apparatus, and the editing operation amount is the number of executions of the editing regarding the imaging setting made for the type of the object multiplied by a time required for the editing process.

6. The information processing apparatus according to claim 1, wherein:
the object to be imaged is a document;
the editing processes related to the editings executed on the plurality of images according to the editing instructions include at least any of deletion of a blank page, correction of an image orientation, division of the document including a plurality of pages, image cutout, removal of a punched hole part of an image, and correction of an OCR result; and
the imaging setting item includes at least any of automatic detection of the blank page, automatic deletion of the blank page, automatic determination of the image orientation, automatic correction of the image orientation, automatic division of the document, automatic image cutout, automatic removal of the punched hole part of the image, and changing of OCR settings.

7. The information processing apparatus according to claim 1, wherein the processor further sets the specified imaging setting item.

8. The information processing apparatus according to claim 7, wherein the processor sets the specified imaging setting item when an instruction to accept the notified imaging setting item is input by the user.

9. A method for causing a computer to execute:
imaging a plurality of objects in accordance with an imaging setting to acquire a plurality of images,
executing, for each of the plurality of images, editing of the image according to an editing instruction given by a user who has performed a quality check of the image, after the image has been acquired, the editing instruction given by an operation for manually editing the image,
recording editing processes related to editings executed on the plurality of images according to editing instructions and, for each editing process, a number of executions of the editing related to the each editing process, and
specifying, when the number of executions of the editing recorded for any of the editing processes satisfies a predetermined reference, an imaging setting item that allows an image to be obtained for which at least a part of the editing related to the any of the editing processes is unnecessary, based on the any of the editing processes, based on the any of the editing processes.

10. A non-transitory computer-readable recording medium on which is recorded a program for causing a computer to execute a process comprising:
imaging a plurality of objects in accordance with an imaging setting to acquire a plurality of images,
executing, for each of the plurality of images, editing of the image according to an editing instruction given by a user who has performed a quality check of the image, after the image has been acquired, the editing instruction given by an operation for manually editing the image,
recording editing processes related to editings executed on the plurality of images according to editing instructions and, for each editing process, a number of executions of the editing related to the each editing process, and
specifying, when the number of executions of the editing recorded for any of the editing processes satisfies a predetermined reference, an imaging setting item that allows an image to be obtained for which at least a part of the editing related to the any of the editing processes is unnecessary, based on the any of the editing processes, based on the any of the editing processes.

* * * * *